(12) United States Patent
Saitoh et al.

(10) Patent No.: US 6,892,578 B2
(45) Date of Patent: *May 17, 2005

(54) ACCELERATION SENSOR

(75) Inventors: Masakatsu Saitoh, Yokohama (JP);
Shinji Furuichi, Mohka (JP); Takashi Satoh, Mohka (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/717,476

(22) Filed: Nov. 21, 2003

(65) Prior Publication Data

US 2004/0123663 A1 Jul. 1, 2004

(30) Foreign Application Priority Data

Nov. 29, 2002 (JP) ........................................ 2002-347549
Jan. 28, 2003 (JP) ........................................ 2003-018715

(51) Int. Cl.$^7$ ............................................. G01P 15/12
(52) U.S. Cl. ............................................. 73/514.33
(58) Field of Search ........................ 73/514.33, 514.34, 73/514.36, 514.38, 493

(56) References Cited

U.S. PATENT DOCUMENTS

| | | | | |
|---|---|---|---|---|
| 5,057,906 A | * | 10/1991 | Ishigami | ..................... 257/706 |
| 5,895,853 A | | 4/1999 | Shiota | |
| 6,257,060 B1 | | 7/2001 | Leonardson et al. | |
| 6,263,735 B1 | * | 7/2001 | Nakatani et al. | ......... 73/514.36 |
| 6,740,982 B2 | * | 5/2004 | Sauter et al. | ................ 257/780 |

FOREIGN PATENT DOCUMENTS

| | | |
|---|---|---|
| EP | 0 631 142 A1 | 12/1994 |
| JP | 04-274005 | 9/1992 |
| JP | 05-041148 | 2/1993 |
| JP | 6-331652 | * 12/1994 |
| JP | 07-128361 | 5/1995 |
| JP | 08-233851 | 9/1996 |
| JP | 10-123166 | * 5/1998 |

* cited by examiner

*Primary Examiner*—Helen Kwok
(74) *Attorney, Agent, or Firm*—Sughrue Mion, PLLC

(57) ABSTRACT

An acceleration sensor in which a regulation plate is fixed with adhesive onto a support frame of a sensor chip of the sensor to limit the movement of a mass portion of the sensor chip within a predetermined gap range. In the acceleration sensor, the adhesion area of the adhesive can be controlled to a predetermined value to prevent a variation of the sensitivity due to the variation of the adhesion area. The sensor chip comprises the mass portion, the frame surrounding the mass portion and having on an upper surface of the frame a plurality of the recesses to fill adhesive into, elastic support arms bridging the mass portion and the frame, and strain gauges formed on the elastic support arms. The regulation plate is fixed with paste onto the frame with the predetermined gap with an upper surface of the mass portion. The paste contains hard plastic balls, of a diameter larger than the predetermined gap, mixed with adhesive. The adhesive is preferably of silicon-rubber resin.

19 Claims, 6 Drawing Sheets

ACCELERATION SENSOR

BACKGROUND OF THE INVENTION

1. Field of the Invention

The present invention relates to an acceleration sensor for detecting acceleration, which is used for toys, automobiles, aircrafts, portable terminals and the like, and particularly to an acceleration sensor that can be produced using a semiconductor technology.

2. Description of the Related Art

Acceleration sensors utilizing a change in physical quantity such as a piezo resistance effect and a change in electrostatic capacity have been developed and commercialized. These acceleration sensors can be widely used in various fields, but recently, such small-sized acceleration sensors as can detect the acceleration in multi-axial directions at one time with high sensitivity are demanded.

Since silicon single crystal becomes an ideal elastic body due to the extreme paucity of lattice defects and since a semiconductor process technology can be applied to it without large modification, much attention is paid to a piezo resistance effect type semiconductor acceleration sensor in which a thin elastic support portion is provided at a silicon single crystal substrate, and the stress applied to the thin elastic support portion is converted into an electric signal by a strain gauge, for example, a piezo resistance effect element, to be an output.

As a three-dimensional acceleration sensor, an acceleration sensor has been used, which comprises elastic support arms each of a beam structure formed by a thin portion of a silicon single crystal substrate connecting a mass portion constituted by a thick portion of a silicon single crystal substrate in a center and a frame in its periphery. A plurality of strain gauges are formed in each axial direction on the elastic support arms. In order to sense a small acceleration with an enhanced sensitivity, the elastic support arms are made long and/or thin, or the mass portion that works as a pendulum is made heavy. The acceleration sensor that can detect a small acceleration has led to an excessive amplitude of the mass portion, when subjected to a large impact, and resulted in breaking of the elastic support arms. To avoid the breaking of the elastic support arms even if a massive impact is applied, regulation plates have been installed above and below the acceleration sensor chip to restrict the amplitude of the mass portion to a certain range.

An acceleration sensor having regulation plates is described in Japanese Laid-Open Patents HEI 4-274005, HEI 5-41148 and HEI 8-233851.

Japanese Laid-Open Patents HEI 4-274005 and HEI 8-233851 also disclose a method in which, to control a gap at a predetermined value between the regulation plates and the mass portion of the acceleration sensor chip, small balls having a diameter of substantially the same distance as a gap are mixed with adhesive, and the adhesive with small balls mixed is used to bond regulation plates to the acceleration sensor chip. The gap can be maintained at a predetermined value because the gap between regulation plates and the acceleration sensor chip can be dictated by a diameter of small balls. The use of adhesive containing small balls thus enables the control of a gap between regulation plates and the acceleration sensor chip. However, if an excessive amount of adhesive is used to bond a support frame to regulation plates, the adhesive may be squeezed out onto an upper surface of elastic support arms, and even the elastic support arms may be stuck. The adhesion area may vary even when adhesive is confined within an upper surface of the support frame.

The variation of the adhesion area causes a variation of the sensitivity of the acceleration sensor chip because stresses are applied to portions bonded by adhesive due to a residual stress from the hardened adhesive, a difference of the thermal expansion coefficient between bonded objects and the adhesive and the like.

Adhesive having a large adhesion strength such as an epoxy resin has been used to fix a regulation plate to an acceleration sensor chip to ensure that the regulation plate will not fall off from the acceleration sensor chip even if an acceleration as large as 1000 G is applied to the acceleration sensor. An epoxy adhesive is favorable in that it remains stuck even when subjected to a large acceleration or impact. However, it exhibits a large variation in the residual stress in response to the variation of the adhesion area.

SUMMARY OF THE INVENTION

It is an object of the present invention to provide an acceleration sensor in which a regulation plate is fixed onto a support frame of an acceleration sensor chip to restrict the movement of a mass portion of the sensor chip to a predetermined gap range, in order to control the adhesion area to a predetermined value to prevent a variation of the sensitivity due to the variation of the adhesion area.

It is another object of the present invention to provide an acceleration sensor in which adhesive having a small residual stress per unit adhesion area is used as adhesive for fixing a regulation plate onto a support frame of an acceleration sensor chip to restrict the movement of a mass portion of the sensor chip within a predetermined gap range, thereby reducing a variation of the sensitivity due to the variation of the adhesion area.

Therefore, an acceleration sensor of the invention comprises an acceleration sensor chip having:

a mass portion located in the center of the acceleration sensor chip, a thick frame surrounding the mass portion and being at a distance from the mass portion and having a plurality of recesses on an upper surface of the thick frame, a plurality of elastic support arms bridging an upper surface of the mass portion and the upper surface of the thick frame, and strain gauges formed on upper surfaces of the elastic support arms. The acceleration sensor further comprises an upper regulation plate provided with a predetermined gap between the upper surface of the mass portion and a lower surface of the upper regulation plate to cover the acceleration sensor chip and fixed on the upper surface of the thick frame by a paste put in the plurality of the recesses on the upper surface of the thick frame. The paste is adhesive mixed with hard plastic balls of diameters larger than the predetermined gap between the upper surface of the mass portion and the lower surface of the upper regulation plate.

In the above-described acceleration sensor of the invention, the hard plastic balls may be of diameters equal to or smaller than the sum of the predetermined gap and a depth of the recesses.

In the above-described acceleration sensor of the invention, the paste may contain 1 to 40 mass % of the hard plastic balls having diameters of 12 um or larger, and the balance being silicon-rubber resin adhesive of Young's Modulus less than $10^{-2}$ G Pa after hardened.

In the above-described acceleration sensor of the invention, it is preferable that the total area of the plurality of the recesses located on the upper surface of the thick frame is 5 to 35% of the area of the upper surface of the thick frame. It is more preferable that the total area of the plurality of the recesses is 5 to 10% of the area of the upper surface of the thick frame. And it is more preferable that each of the recesses located on the upper surface of the thick frame has a side opening on an outer side surface of the thick frame.

Also, it is preferable that the thick frame is rectangular, and each of the recesses is located in each of the corners of the rectangular thick frame.

An acceleration sensor device of the invention comprises the acceleration sensor described above and a protection case having a side frame and an inner bottom plate surrounded by the side frame. The acceleration sensor is installed in the protection case with a lower surface of the thick frame fixed on the inner bottom plate by adhesive with a second predetermined gap between the lower surface of the mass portion and the inner bottom plate.

The acceleration sensor chip may further have a plurality of first input/output terminals on the upper surface of the thick frame, and conductors each connecting each of the first input/output terminals with the strain gauge along from the upper surface of the elastic support arm having the strain gauge to the upper surface of the thick frame. The protection case has on the side frame a plurality of second input/output terminals each of which is connected with each of the first input/output terminals by a lead wire. The upper regulation plate may have a side opening on a side, corresponding to the first input/output terminals, of the upper regulation plate to allow the lead wire to pass through the side opening and to prevent the lead wire from contacting the upper regulation plate.

DETAILED DESCRIPTION OF THE PREFERRED EMBODIMENTS

EXAMPLE 1

Figure 1:
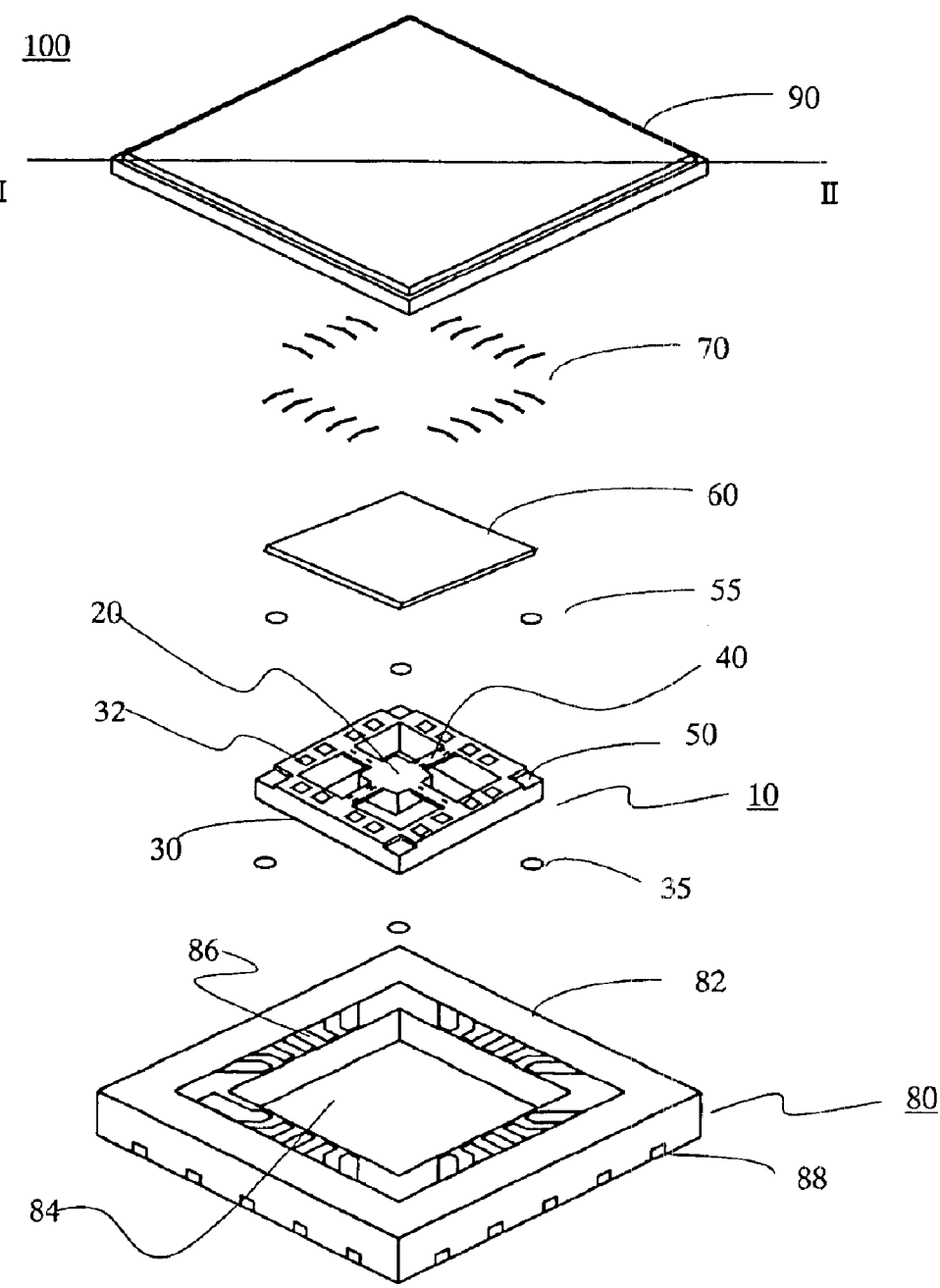
FIG. 1 is an exploded perspective view of the semiconductor acceleration sensor device of the first embodiment of the invention.
Figure 2:
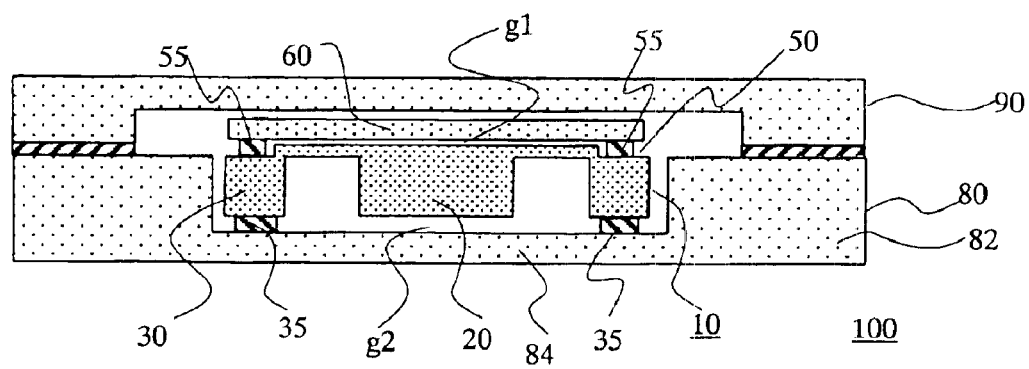
FIG. 2 is a cross sectional view take along the line II—II in FIG. 1.
Figure 3:
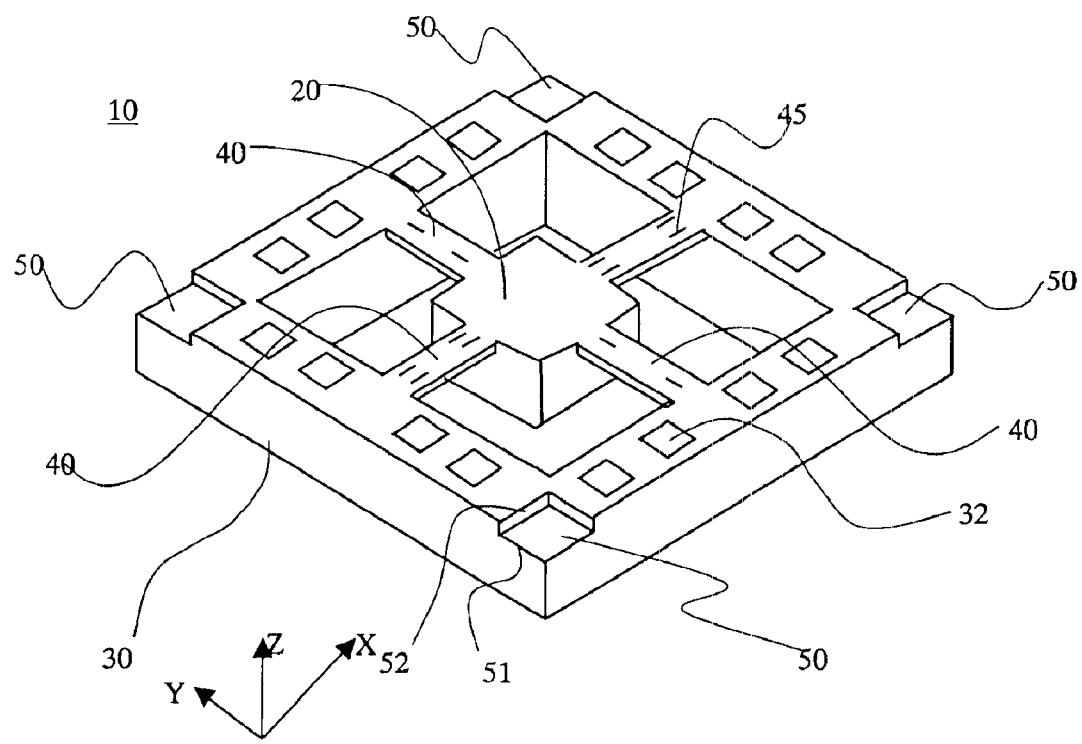
FIG. 3 is a perspective view of the acceleration sensor chip to be used in the acceleration sensor device shown in FIG. 1.
Figure 4:
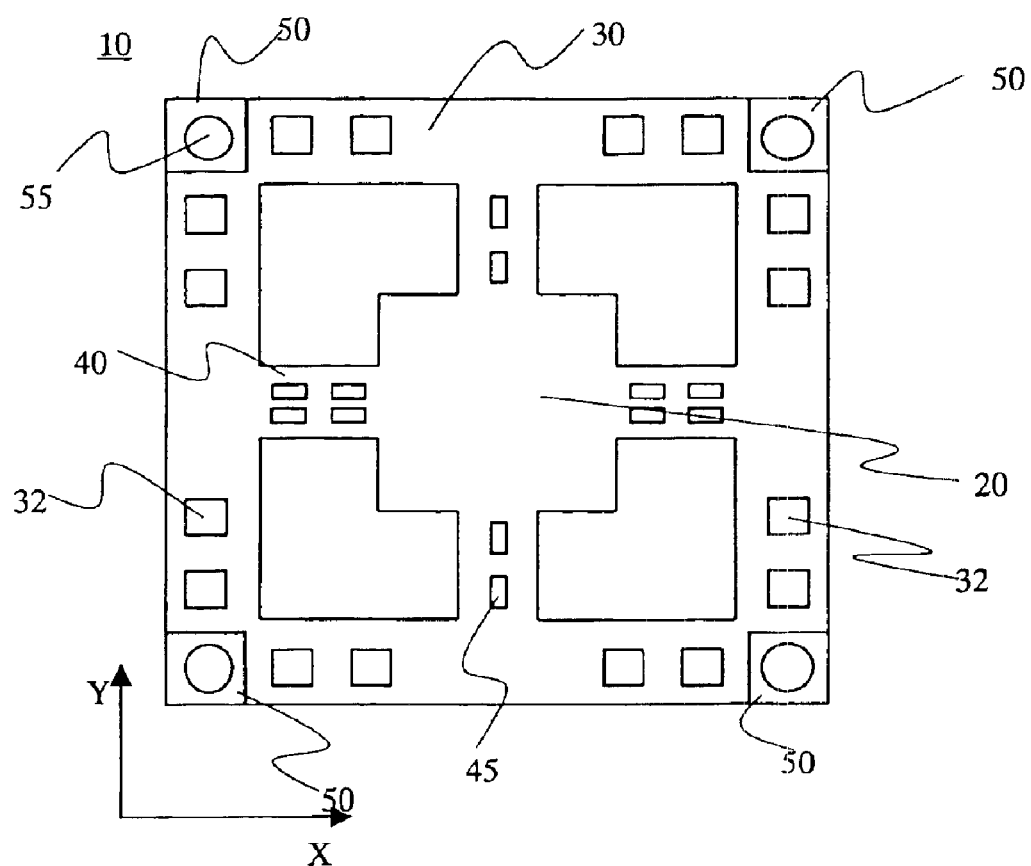
FIG. 4 is a plan view of the acceleration sensor chip of FIG. 3.

A first embodiment of the present invention will be explained, referring to FIGS. 1 through 4. FIG. 1 is an exploded perspective view of a semiconductor acceleration sensor device of the first embodiment of the invention, FIG. 2 is a cross sectional view taken along the line II—II in FIG. 1, FIG. 3 is a perspective view of an acceleration sensor chip to be used in the acceleration sensor device shown in FIG. 1, and FIG. 4 is a plan view of the acceleration sensor chip of FIG. 3.

The acceleration sensor chip 10 for the present invention uses a silicon single crystal substrate with an SOI layer being formed via a $SiO_2$ insulation layer, namely, an SOI wafer, in order to make it possible to control the thickness of elastic support arms with high precision. The SOI is an abbreviation of Silicon On Insulator. In this example, a wafer formed by thinly forming the $SiO_2$ insulation layer being an etching stopper (about 1 um) on a Si wafer with thickness of about 600 um, on which an N-type silicon single crystal layer with thickness of about 10 um is formed, is used as a substrate. The acceleration sensor chip is constituted by a mass portion 20 in a center, which is constituted by a thick portion of the silicon single crystal substrate; a square-shaped frame 30 placed around the mass portion 20 to surround it; two pairs of beam-shaped elastic support arms 40 that are constituted by thin portions of the silicon single crystal substrate to connect the mass portion 20 and the frame 30, strain gauges (in the following explanation, "piezoresistors" as an example of the strain gauge is used, and therefore they are called "piezoresistors") 45, four of which are for each axis, and which are placed on the elastic support arms correspondingly to two detection axes (X and Y axes) perpendicular to each other and the detection axis (Z axis) orthogonal to the top surface of the acceleration sensor chip. Namely, the two piezoresistors 45 are provided on each of the elastic support arms 40, which extend in the X-axis direction to detect the acceleration in the X-axis direction. The two piezoresistors 45 are provided on each of the elastic support arms 40, which extend in the Y-axis direction to detect the acceleration in the Y-axis direction. Further two piezoresistors 45 are provided on each of the elastic support arms 40, which extend in the X-axis direction to detect the acceleration in the Z-axis direction. In this example, the acceleration in the Z-axis direction is detected by the piezoresistors provided on the elastic support arms 40 extending in the X-axis direction, but the elements for detecting the acceleration in the Z-axis direction may be provided on the elastic support arms 40 extending in the Y-axis direction. Four of the piezoresistors for detecting the acceleration in each axis direction construct a full bridge detection circuit.

A plurality of input/output terminals 32 are provided on the upper surface of the thick frame 30 of the acceleration sensor chip 10. The first input/output terminals 32 are connected to terminals of twelve piezoresistors 45 on the elastic support arms by each of a plurality of conductors provided from the upper surfaces of the elastic support arms to the upper surface of the thick frame. FIGS. 1 through 4 do not show these conductors that connect the first input/output terminals 32 to the piezoresistors 45.

The upper regulation plate 60 is mounted to cover the upper surface of the acceleration sensor chip 10. A predetermined gap, for example a gap g1 of 5 to 15 um, is provided between the lower surface of the upper regulation plate 60 and the upper surface of the mass portion 20 of the acceleration sensor chip 10. Each corner of the upper surface of the thick frame 30 of the acceleration sensor chip 10, which is a square thick frame in this embodiment, is provided with a respective recess 50. The recesses 50 are filled with paste 55 to fix the upper regulation plate 60 onto the acceleration sensor chip 10.

The upper regulation plate may be made of borosilicate glass and the like in the invention. The linear thermal expansion coefficient of borosilicate glass is approximately $7×10^{-6}$, which is larger than that of silicon, i.e. $2.4×10^{-6}$. The use of adhesive having a small hardness after it is hardened, however, enables the use of a material having such a large linear expansion coefficient for the upper regulation plate.

The acceleration sensor, which is comprised of the acceleration sensor chip 10 and the upper regulation plate 60 spaced at a predetermined gap from the acceleration sensor chip, is mounted in a protection case 80 made of a material such as alumina, as shown in FIGS. 1 and 2. A cap 90 made of a material such as alumina is mounted on the top of the protection case 80.

The protection case 80 has a side frame 82 and an inner bottom plate 84, and a lower surface of the thick frame of the acceleration sensor chip 10 is fixedly bonded onto the inner bottom plate 84. When the acceleration sensor chip 10 is fixed to the inner bottom plate 84, the mass portion 20 in the center of the acceleration sensor chip 10 is not contacted with the bottom plate 84 of the protection case 80 and maintains a predetermined gap g2, which may also be referred to as a "second predetermined gap" because it can have a different length from a gap between the upper surface of the mass portion and the upper regulation plate. The inner bottom plate 84 maintains a gap from the lower surface of the mass portion 20 and restricts the downward vibration within the gap, acting as a lower regulation plate.

The side frame 82 of the protection case 80 has a plurality of second input/output terminals 86, and each of the first input/output terminals 32 of the acceleration sensor chip mounted in the protection case is connected to these second input/output terminals 86 by lead wires 70. Each of the second input/output terminals 86 is in turn connected to a plurality of external terminals 88 provided in side surfaces of the protection case 80 by conductors within the side frame 82. These conductors are not important in the invention and therefore are not shown.

The size of the acceleration sensor chip will now be described. The length of a side of the square acceleration sensor chip 10 is approximately 3300 um, and the thick frame 30 has a thickness of 600 um and a width of 450 um. The mass portion 20 in the center has a side of approximately 1000 um in length, and a thickness of 600 um. Four elastic support arms 40 have a length of 700 um and a width of 110 um, and are made of silicon on $SiO_2$ insulation layer, which has a thickness of approximately 10 um.

A recess 50 of 350 um×350 um is formed in each corner of the upper surface of the thick frame 30, and has a depth of 10 um. Two sides of each recess 50 are provided with side openings 51 on outer side surfaces of the thick frame 30, and banks 52 that have a height as high as the depth of the recess are formed on other two sides by the upper surface of the thick frame. A paste 55 is filled into the recesses, and the upper regulation plate 60 is bonded to the acceleration sensor chip 10. The paste is adhesive mixed with hard plastic balls. The paste thus filled in the recesses may limit the adhesion area where the acceleration sensor chip is bonded to the upper regulation plate within the area of the recesses, keeping the adhesion area at a predetermined size. If an excessive amount of paste is filled into the recesses, the adhesive may be squeezed out of the recesses. If hard plastic balls having diameters of 12 um or larger mixed in the paste are used, however, little paste may be squeezed out, as described below. As in this embodiment, a side opening 51 provided on at least one outer side of the thick frame of a recess allows excessively filled adhesive to flow out through the side opening 51, further enabling the control of the adhesion area. Especially, if unhardened adhesive with good flowability is excessively used, the excessive amount of adhesive may expand the adhesion area. A side opening provided on an outer side surface of the thick frame, however, allows adhesive to flow out therefrom, maintaining the adhesion area at a predetermined size.

The adhesion area can substantially be determined by the area of the recesses in the invention. As in this embodiment, each of the 350 um×350 um recesses located at each of four corners results in $0.49×10^6$ $um^2$ in the total area of the recesses, accounting for approximately 9.6% of the area of the thick frame, which is $5.13×10^6$ $um^2$.

The paste used here contains on the order of 10 mass % of the hard plastic balls having diameters of approximately 15 um. The hard plastic balls are made of a divinylbenzene-based cross-linked copolymer, and may be commercially available products for regulating gaps in liquid crystal displays. A ball with a nominal diameter of 15 um is highly precise; an average particle diameter is 15 um±0.1 um, and the standard deviation of the diameter is 0.6 um.

The paste contains adhesive that remains elastic even after hardened. Silicon-rubber resin adhesive such as DA6501 from Dow Corning Toray Silicone Co., Ltd. may preferably be used as adhesive. The silicon-rubber resin adhesive is sufficiently elastic, having Young's Modulus less than $8.8×10^{-4}$ G Pa after hardened. Since such adhesive that remains elastic even after hardened is thus used to fix the upper regulation plate to the acceleration sensor chip, the acceleration sensor chip will not be subject to a large stress after the adhesive is hardened.

In an acceleration sensor device 100 of the invention, the same paste as one used to fix the upper regulation plate 60 to the upper surface of the thick frame is used as the paste 35 for fixing the lower surface of the thick frame 30 of the acceleration sensor chip 10 onto the inner bottom plate 84 of the protection case 80. Since the paste contains hard plastic balls, a gap having the same distance as the diameters of the hard plastic balls or wider distance by the thickness of adhesive may be formed between the lower surface of the mass portion and the inner bottom plate, even when recesses are not formed on the inner bottom plate at locations corresponding to the lower surface of the thick frame. It is advantageous to use the same paste for both fixing the upper regulation plate to the acceleration sensor chip, and the acceleration chip into the protection case in view of workability. Other adhesive such as epoxy adhesive may, however, be used for fixing the lower surface of the thick frame of the acceleration sensor chip to the inner bottom plate, given that the adhesion area is less likely to affect the sensitivity of the acceleration chip.

EXAMPLE 2

Comparative Experiments of Acceleration Sensor Devices of the First Embodiment with Compared Devices One hundred acceleration sensor devices of the first embodiment were produced and their sensitivities and offset voltages were measured. Other one hundred acceleration sensor devices (referred to as compared devices) similar to the first embodiment except that they had no recesses formed thereon were produced and their sensitivities and offset voltages were measured. The sensitivity refers to an output voltage measured when acceleration of 1 G is applied, and a variation of the sensitivity (variation range ratio) was represented by a percentage of the difference between the maximum and minimum sensitivities of measured sensitivities divided by an average sensitivity. The acceleration sensor devices of the first embodiment provided for a 10% reduction of the variation range ratio of sensitivity compared to the compared devices. The offset voltage refers to an output voltage without acceleration, and the variation range ratio of the offset voltages was represented by a percentage of the difference between the maximum and minimum offset voltages of measured offset voltages divided by an average offset voltage. The acceleration sensor devices of the first embodiment provided for a 23% reduction of the variation range ratio of offset voltage compared to the compared devices.

In addition, the impact resistance is evaluated by gravity dropping both the acceleration sensor devices of the first embodiment and the compared devices from a height of 1 m onto a cryptomeria board having a thickness of 10 cm, and then applying acceleration on the order of 10 G to determine the presence of an output. Any acceleration sensor devices could provide outputs, and therefore, it was found that the acceleration sensor device of the invention, as well as the conventional one, could well keep the upper regulation plate fixed with the paste contained in the recesses, without removing the upper regulation plate with the impact described above.

EXAMPLE 3
Relation Between Sensitivity and Resin Adhesion Area

Figure 5:
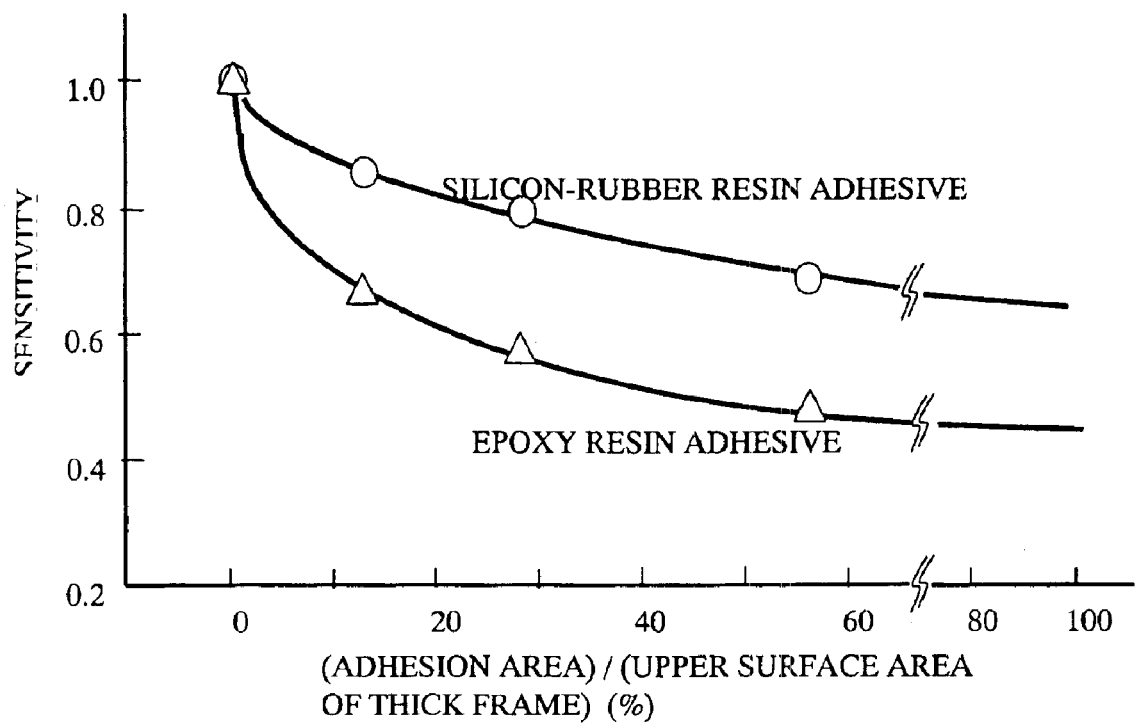
FIG. 5 is a graph showing sensitivity vs. ratio (%) of adhesion area to upper surface area of thick frame of acceleration sensors.

Similar acceleration sensors to ones used in the acceleration sensor devices of the first embodiment, which had upper regulation plates mounted on the acceleration sensor chips without protection cases, were produced with different sizes of recesses on their thick frame. One type of paste that contains 10 mass % of the hard plastic balls having diameters of 15 um and silicon-rubber resin adhesive for the remaining portion of the paste, and another that contains the epoxy adhesive instead of the silicon-rubber resin adhesive are used as the paste for fixing the upper regulation plate to the acceleration sensor chip. FIG. 5 shows the measurements of the sensitivities of these acceleration sensors. The graph in the FIG. 5 shows the sensitivities in the axis of ordinates and the ratios of the areas of the recesses (adhesion area) to the areas of the thick portions in the axis of abscissas. The sensitivities refer to output voltages of the acceleration sensors for 1 G, and the sensitivity is shown for each sensor, referencing the sensitivity of an acceleration sensor without a bonded upper regulation plate as 1.0.

As clearly seen in this graph, the acceleration sensors using silicon-rubber resin adhesive experienced very little reduction of the sensitivity compared to ones using epoxy adhesive as the adhesion area increases. Even though silicon-rubber resin adhesive has $300 \times 10^{-6}$ of the linear thermal expansion coefficient much larger than that of epoxy adhesive, which is $90 \times 10^{-6}$, it has a small reduction of the sensitivity with the increase of the area. It is considered that silicon-rubber resin adhesive remains elastic after hardened, and therefore it may not exert a very large stress on the thick frame of the acceleration sensor. In the invention, the adhesive has Young's Modulus less than $10^{-2}$ G Pa after hardened, and therefore the sensitivity is not greatly reduced with the increase of the adhesion area.

As also seen in this graph, the reduction of the sensitivity can be limited within approximately 10% when silicon-rubber resin adhesive is used, and within approximately 30% when epoxy adhesive is used, in the case of the adhesion area of 10% or less. When silicon-rubber resin adhesive is used, the reduction of the sensitivity can be limited within 20% if the adhesion area is less than 35%. The smaller the adhesion area is, the better it is in terms of minimizing the reduction of the sensitivity. Too small area, however, leads to a weak adhesion, compromising the impact resistance. According to other experiments conducted by the inventors, it has been found that the adhesion area more than 5% of the upper surface of the thick frame could withstand an impact on the order of 1000 G. The adhesion area or the area of the recesses, therefore, may preferably be 5 to 35% of the area of the upper surface of the thick frame, and more preferably, the adhesion area or the area of the recesses may be 5 to 10% of the area of the upper surface of the thick frame.

EXAMPLE 4
Diameters of Hard Plastic Balls

Acceleration sensors that were similar to ones used in the acceleration sensor devices of the first embodiment and that had no recesses formed in the regions of adhesion on the upper surface of the thick frame were produced with hard plastic balls ranging from 5 um to 30 um contained in the paste. The paste of approximately 1.5 ug that contains 10 mass % of the hard plastic balls and silicon-rubber resin adhesive for the remaining portion of the paste were applied onto four corners of the thick frame of the acceleration sensor chip so as to achieve a diameter of approximately 400 um, and the upper regulation plate made of glass was placed and then a load of approximately 15 g was applied thereon. Before the resin adhesive was hardened, the upper regulation plate was removed from the acceleration sensor chip, and the area of the stuck paste spread by the regulation plate was observed. The result is shown in TABLE 1 for each diameter of the hard plastic balls that were used, where an area of the stuck paste was judged as "not good" when it was expanded by more than 50 um in diameter, as "fair" when it was expanded by 50 to 10 um, and as "good" when it was expanded by less than 10 um or the expansion was negligible.

TABLE 1

| | Ball diameter (μm) | | | | | | |
|---|---|---|---|---|---|---|---|
| | 5 | 8 | 10 | 12 | 15 | 20 | 30 |
| Evaluation | not good | not good | not good | fair | good | good | good |

As seen in the result, paste that contains the hard plastic balls having diameters of 12 um or more has not shown the significant expansion of the adhesion area, and therefore is suitable to use in the invention.

The hard plastic balls used in the paste have diameters larger than the gap between the lower surface of the upper regulation plate and the upper surface of the mass portion. When the paste was filled in the recess, a part of the hard plastic ball is protruded out of the recesses. It is preferred to create a recess having a depth of 5 to 10 um, and to select such hard plastic ball that a 3/10 to 9/10 portion of the hard plastic ball may be fallen within the recess. Additionally, to avoid a significant expansion of the adhesive paste, it is preferred to use a hard plastic ball having a diameter of 12 um or more, according to the result described above.

EXAMPLE 5

Figure 6:
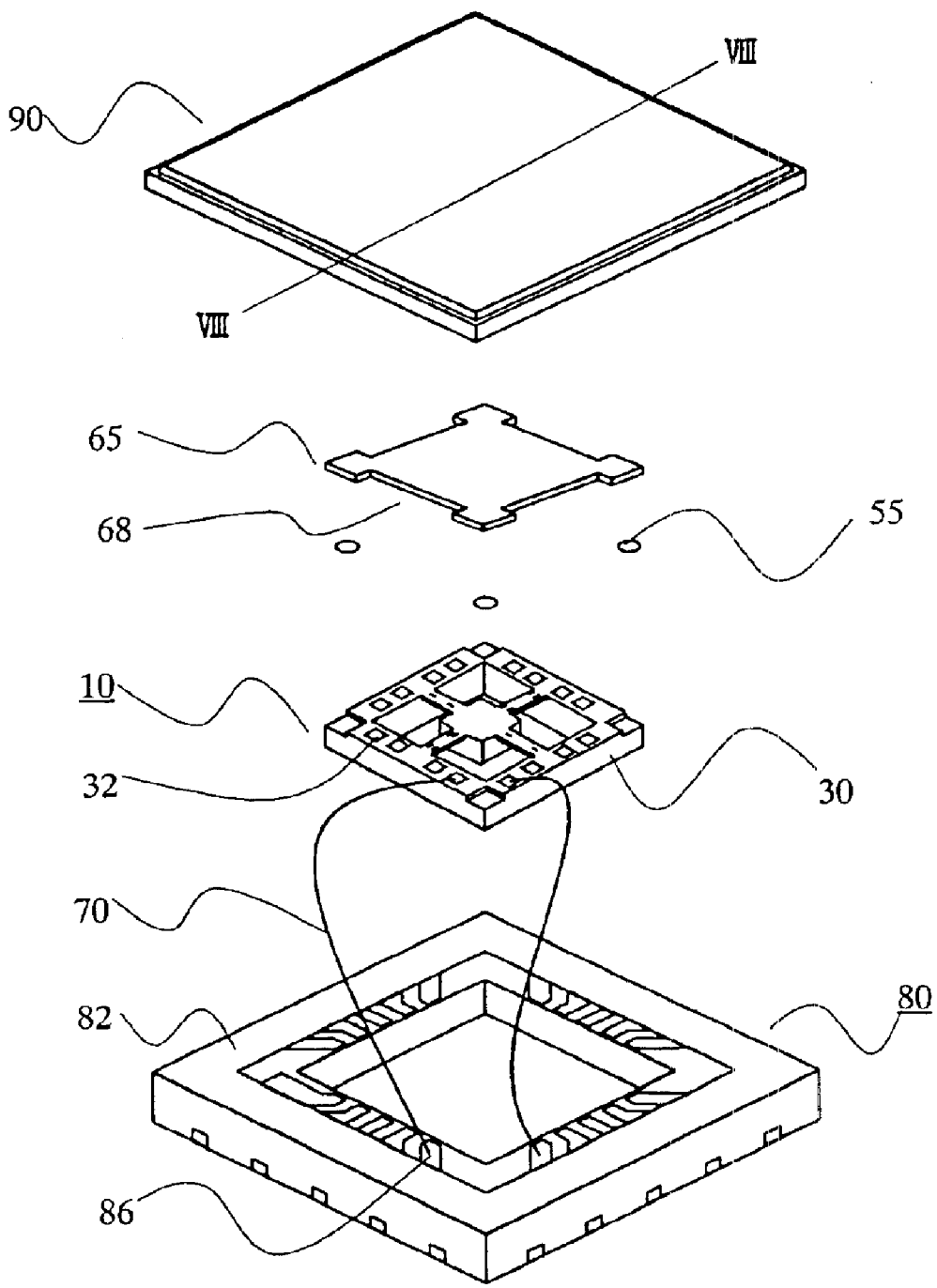
FIG. 6 is an exploded perspective view of the semiconductor acceleration sensor device of another embodiment.
Figure 7:
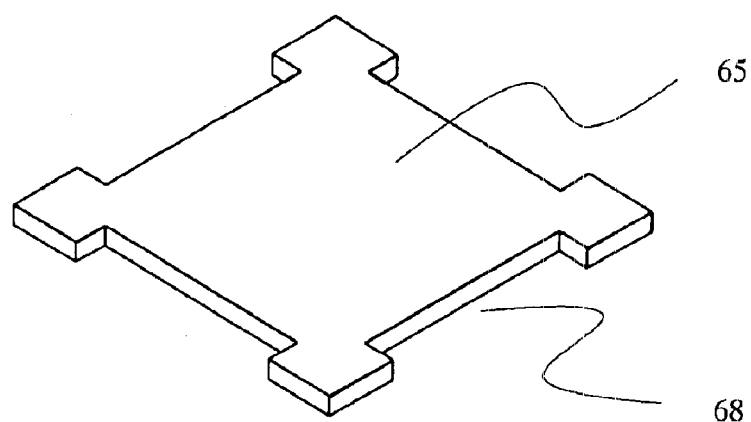
FIG. 7 is a perspective view of the upper regulation plate used in the acceleration sensor device shown in FIG. 6.
Figure 8:
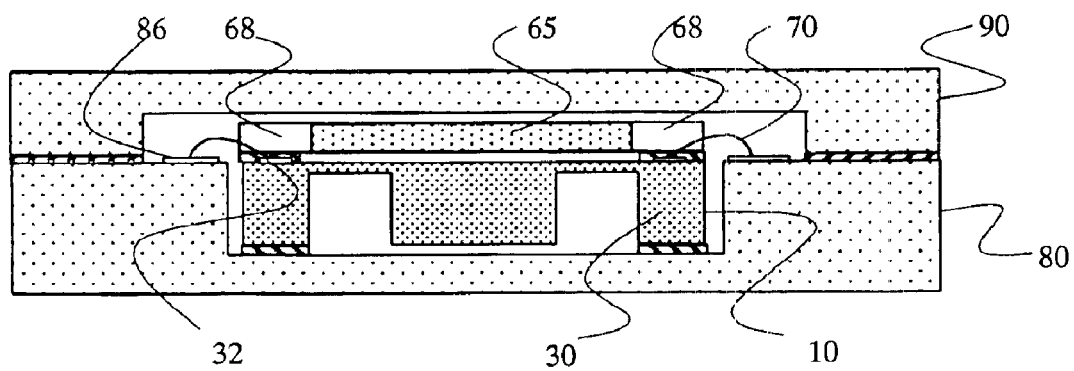
FIG. 8 is a cross sectional view take along the line VIII—VIII in FIG. 6.

Other embodiments of the invention will now be described with reference to FIGS. 6 to 8. FIG. 6 shows an exploded perspective view of the semiconductor acceleration sensor device according to the embodiment, FIG. 7 shows a perspective view of the upper regulation plate used in the acceleration sensor device in FIG. 6, and FIG. 8 shows a sectional view taken along a line VIII—VIII in FIG. 6. In FIGS. 6 to 8, like reference numerals are used to denote like parts shown in FIGS. 1 to 4. For the acceleration sensor device in FIGS. 6 to 8, a difference of the shape of an upper regulation plate 65 will now be described because it is different from the one in FIGS. 1 to 4.

The upper regulation plate 65 has a side opening (notch) 68 formed on each of the surrounding sides. When the upper regulation plate 65 is mounted on the acceleration sensor chip 10, the side openings 68 are located on first input/output terminals 32 on the upper surface of the thick frame 30 of the acceleration sensor chip. When second input/output terminals 86 provided on the protection case 80 are connected to the first input/output terminals 32 provided on the acceleration sensor chip by lead wires 70, the lead wires 70 may pass through the side openings 68 on the upper regulation plate 65 to avoid contacts with the upper regulation plate 65.

Since the upper regulation plate has side openings, lead wires can be provided between the first input/output terminals and the second input/output terminals after the acceleration sensor chip with the upper regulation plate mounted thereon is incorporated into the protection case. Additionally, lead wires may not be contacted with the upper regulation plate, and therefore, relatively large wires may be used.

In the above description, although the recesses are formed in four corners of the upper surface of the thick frame to be filled with paste for bonding the upper regulation plate, the recesses may be provided wherever on the upper surface of the thick frame. However, the recesses may preferably be spaced apart from the elastic support arms as far as possible, and they may most preferably be provided on four corners of the upper surface of the thick frame as in the first embodiment.

What is claimed is:

1. An acceleration sensor comprising:
    an acceleration sensor chip having
        a mass portion located in a center of the acceleration sensor chip,
        a thick frame surrounding the mass portion and being at a distance from the mass portion and having a plurality of recesses on an upper surface of the thick frame, each of the recesses having a bottom surface under the upper surface of the thick frame,
        a plurality of elastic support arms bridging an upper surface of the mass portion and the upper surface of the thick frame, and
        strain gauges formed on upper surfaces of the elastic support arms; and
    an upper regulation plate mounted with a predetermined gap between the upper surface of the mass portion and a lower surface of the upper regulation plate to cover the acceleration sensor chip and fixed on the upper surface of the thick frame by an adhesive paste disposed in the plurality of the recesses on the upper surface of the thick frame,
    wherein the paste is adhesive mixed with hard plastic balls of diameters larger than the predetermined gap between the upper surface of the mass portion and the lower surface of the upper regulation plate.

2. An acceleration sensor as set forth in claim 1, wherein the hard plastic balls are of diameters equal to or smaller than the sum of the predetermined gap and a depth of the recesses.

3. An acceleration sensor as set forth in claim 1, wherein the paste contains 1 to 40 mass % of the hard plastic balls having diameters of 12 um or larger, and the balance being silicon-rubber resin adhesive of Young's Modulus less than $10^{-2}$ G Pa after hardened.

4. An acceleration sensor as set forth in claim 1, wherein the total area of the plurality of the recesses located on the upper surface of the thick frame is 5 to 35% of the area of the upper surface of the thick frame.

5. An acceleration sensor as set forth in claim 3, wherein the total area of the plurality of the recesses located on the upper surface of the thick frame is 5 to 35% of the area of the upper surface of the thick frame.

6. An acceleration sensor as set forth in claim 4, wherein each of the recesses located on the upper surface of the thick frame has a side opening on an outer side surface of the thick frame.

7. An acceleration sensor as set forth in claim 5, wherein each of the recesses located on the upper surface of the thick frame has a side opening on an outer side surface of the thick frame.

8. An acceleration sensor as set forth in claim 6, wherein the thick frame is rectangular, and each of the recesses is located in each of the corners of the rectangular thick frame.

9. An acceleration sensor as set forth in claim 7, wherein the thick frame is rectangular, and each of the recesses is located in each of the corners of the rectangular thick frame.

10. An acceleration sensor device comprising:
    an acceleration sensor comprising:
        an acceleration sensor chip having
            a mass portion located in a center of the acceleration sensor chip,
            a thick frame surrounding the mass portion and being at a distance from the mass portion and having a plurality of recesses on an upper surface of the thick frame, each of the recesses having a bottom surface under the upper surface of the thick frame,
            a plurality of elastic support arms bridging an upper surface of the mass portion and the upper surface of the thick frame, and
            strain gauges formed on upper surfaces of the elastic support arms; and
        an upper regulation plate mounted with a predetermined gap between the upper surface of the mass portion and a lower surface of the upper regulation plate to cover the acceleration sensor chip and fixed on the upper surface of the thick frame by a first adhesive paste put in the plurality of the recesses on the upper surface of the thick frame,
        the paste being adhesive mixed with hard plastic balls of diameters larger than the predetermined gap between the upper surface of the mass portion and the lower surface of the upper regulation plate, and
    a protection case having a side frame and an inner bottom plate surrounded by the side frame,
    wherein a lower surface of the thick frame is fixed on the inner bottom plate by adhesive with a second predetermined gap between a lower surface of the mass portion and the inner bottom plate to install the acceleration sensor in the protection case.

11. An acceleration sensor device as set forth in claim 10, wherein the lower surface of the thick frame is fixed on the inner bottom plate with the second predetermined gap between the lower surface of the mass portion and the inner bottom plate by a second adhesive paste that is adhesive mixed with hard plastic balls.

12. An acceleration sensor device as set forth in claim 11, wherein both the first paste and the second paste contain 1 to 40 mass % of the hard plastic balls having diameters of 12 um or larger, and the balance being silicon-rubber resin adhesive of Young's Modulus less than $10^{-2}$ G Pa after hardened.

13. An acceleration sensor device as set forth in claim 12, wherein the total area of the plurality of the recesses located on the upper surface of the thick frame is 5 to 35% of the area of the upper surface of the thick frame.

14. An acceleration sensor device as set forth in claim 13, wherein each of the recesses located on the upper surface of the thick frame has a side opening on an outer side surface of the thick frame.

15. An acceleration sensor device as set forth in claim 14, wherein the thick frame is rectangular, and each of the recesses is located in each of the corners of the rectangular thick frame.

16. An acceleration sensor device as set forth in claim 10, wherein the acceleration sensor chip further has a plurality of first input/output terminals on the upper surface of the thick frame, and a plurality of conductors connecting the first input/output terminals with the strain gauges, and extending from the upper surfaces of the elastic support arms having the strain gauges to the upper surface of the thick frame;

the protection case has on the side frame a plurality of second input/output terminals each of which is connected with each of the first input/output terminals by a lead wire; and the upper regulation plate has a side opening on a side, corresponding to the first input/output terminals, of the upper regulation plate to allow the lead wire to pass through the side opening and to prevent the lead wire from contacting the upper regulation plate.

17. An acceleration sensor device as set forth in claim 15, wherein the acceleration sensor chip further has a plurality of first input/output terminals on the upper surface of the thick frame, and a plurality of conductors connecting the first input/output terminals with the strain gauges, and extending from the upper surfaces of the elastic support arms having the strain gauges to the upper surface of the thick frame;

the protection case has on the side frame a plurality of second input/output terminals each of which is connected with each of the first input/output terminals by a lead wire; and the upper regulation plate has a side opening on a side, corresponding to the first input/output terminals, of the upper regulation plate to allow the lead wire to pass through the side opening and to prevent the lead wire from contacting the upper regulation plate.

18. The acceleration sensor as set forth in claim 1, wherein the adhesive paste is non-electroconductive.

19. The acceleration sensor as set forth in claim 10, wherein the adhesive paste is non-electroconductive.

* * * * *